Figure 1:
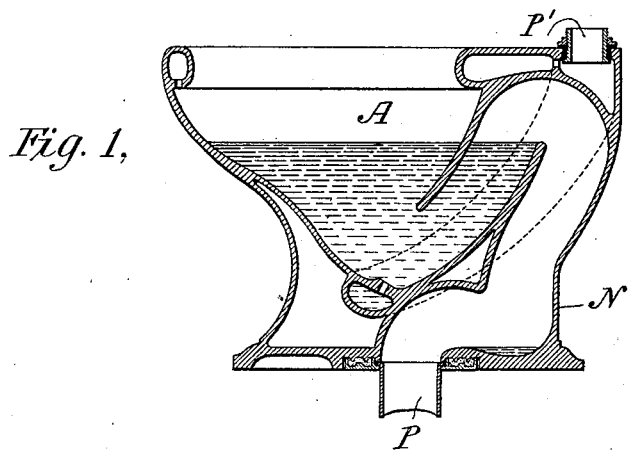

No. 628,004. Patented July 4, 1899.
W. E. HINSDALE.
SOIL PIPE CONNECTION FOR WATER CLOSETS, &c.
(Application filed Apr. 15, 1899.)
(No Model.)

WITNESSES:
C. E. Ashley
M. F. Keating

INVENTOR:
Winfield E. Hinsdale
By his Attorney
Charles J. Kintner

THE NORRIS PETERS CO., PHOTO-LITHO., WASHINGTON, D. C.

UNITED STATES PATENT OFFICE.

WINFIELD E. HINSDALE, OF NEW YORK, N. Y.

SOIL-PIPE CONNECTION FOR WATER-CLOSETS, &c.

SPECIFICATION forming part of Letters Patent No. 628,004, dated July 4, 1899.

Application filed April 15, 1899. Serial No. 713,215. (No model.)

*To all whom it may concern:*

Be it known that I, WINFIELD E. HINSDALE, a citizen of the United States, residing at New York, in the borough of Manhattan, county and State of New York, have made a new and useful Improvement in Soil-Pipe Connections for Water-Closets, Slop-Sinks, and Urinals, of which the following is a specification.

My improvement has for its objects, first, to provide a soil-pipe connection for such uses which will be absolutely gas and water tight under all conditions of usage; second, to provide a soil-pipe connection which will enable the plumber to put the same in place in connection with the soil-pipe with the least possible inconvenience no matter what may be the position of the pipe to which connection is made, and, third, to provide a soil-pipe connection which will adapt itself for use in connection with an earthenware closet the foot of which may have warped slightly during the process of construction.

My improvement will be fully understood by referring to the drawings, in which—

Figure 2:
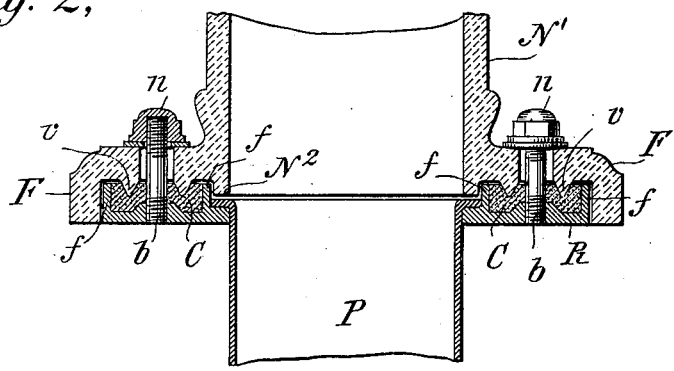
Figure 3:
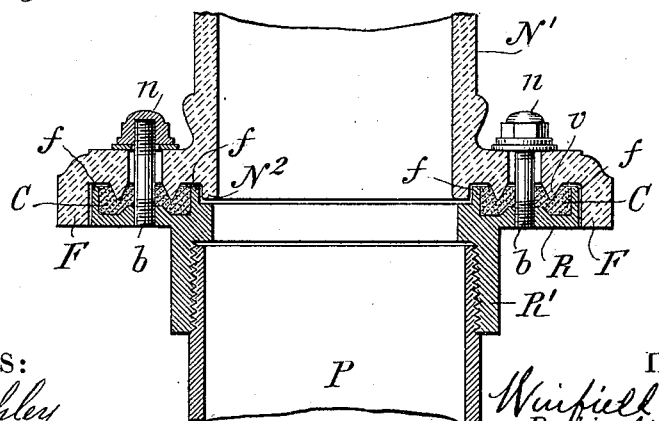

Figure 1 is a vertical sectional view of a siphon water-closet with a specially-modeled foot having a circular recess or groove molded around the outlet-hole, illustrating also my improved soil-pipe connection. Fig. 2 is an enlarged vertical sectional view of my novel form of connection, illustrating its attachment to a lead soil-pipe; and Fig. 3 is a similar enlarged vertical sectional view thereof, illustrating its attachment to an iron soil-pipe.

Prior to my invention it was customary in the art to make a connection of the character indicated with a lead soil-pipe by soldering the upper end of the same to a brass floor-ring provided with an upwardly-extending flange, the foot of the closet being provided with a downwardly-extending flange and the adjacent surfaces of said flanges so shaped that when the parts were secured together by bolts and a rubber ring located between said flanges a gas and water tight connection was effected. Such an arrangement, however, is open to the objection that after a time the rubber hardens and cracks and therefore permits the egress of gas and water. It was also customary to form such a connection with an iron soil-pipe by providing an interiorly-screw-threaded brass ring with a laterally-extending floor flange or ring and exterior grooves in the outer surface of said flange, corresponding grooves being provided in the inner face of a downwardly-extending flange on the foot of the earthenware closet, said parts being bolted together by bolts at the factory and the concentric grooves filled with lead; but such a structure is open to the objection that in putting it in place in connection with the soil-pipe it is absolutely necessary that in order to obtain a gas and water tight connection the parts shall be screwed firmly home. It will be apparent that under certain conditions of usage this is not practical, owing to the fact that a closet should always be so located that its rear will be in alinement with the rear wall, a condition of affairs which is not always possible, as will be appreciated, for the reason that when screwed firmly home the closet may and often does assume a position bearing different angles with relation to such wall. Such a structure is also open to the objection that the soil-pipe should always be located at a distance from the rear wall sufficient to admit of the turning of the closet completely around in screwing it to the pipe, thereby wasting much space. The more generally used soil-pipe connection, however, consists of a brass floor flange or ring soldered to a lead soil-pipe and adapted to be secured to the closet by bolts extending through a lateral flange or ring at the foot thereof and provided with a downwardly-extending flange at the outer edge of the brass floor flange or ring and an inward downwardly-extending flange or nozzle for the discharge of water fitting inside of the lead soil-pipe, the space between the flanges being filled with putty or any well-known plastic compound and oftentimes with a corrugated rubber gasket and all securely held together by the aforesaid bolts. With this form of connection, however, the putty soon dries and cracks, leaving openings for the escape of sewer-gas. Furthermore, the rubber, as before indicated, deteriorates and is liable to become cracked, and thus leave openings for the escape of gas. Inasmuch as the downwardly-projecting nozzle of the closet extends below the floor-line or base attachment it is frequently broken off in handling, and the plumber puts it in place without repair, thus making an imperfect connection which permits the escape of sewer-gas and water.

My improvement effectually overcomes the objectionable features of the existing types of soil-pipe connections above referred to.

Referring to the drawings in detail for a full and clear understanding of the improvement, such as will enable others skilled in the art to make and use the same, A represents an earthenware closet of the siphon type having a downwardly-extending neck N and an attachment P' for a flushing-pipe, P being a waste-pipe connected by my improved soil-pipe connection to the closet.

Referring to Fig. 2 for a detail description of the parts, N' represents the downwardly-extending neck of an earthenware closet having a laterally-extending floor-flange F, provided with an enlarged groove in its under surface, N² being a downwardly-extending neck at the interior thereof and $v\,v$ downwardly-extending concentric V-shaped rings. Radially arranged around the floor-flange and between the rings $v\,v$ is a series of bolt-holes adapted to receive screw-bolts $b\,b$.

R is a brass floor flange or ring grooved in its upper surface and adapted to fit loosely within the groove in the lower surface of the floor-flange F, said ring R being provided with screw-threaded holes for receiving the lower ends of the bolts $b\,b$, ring-flanges $f\,f$, extending upward into the recess or groove in the floor-flange F, and an inwardly-extending flange, to which the upper end of the lead soil-pipe P is secured by solder.

C is a cement of any well-known form, which may be put in position in plastic condition, the arrangement being such that when the parts are put together, as shown, and firmly secured by the bolts $b\,b$ and nuts $n\,n$ the downwardly-extending concentric V-shaped rings $v\,v$ cause the cement to be forced into the interstices or spaces between the lower end of the neck N' and N² and thoroughly seal the same. If sufficient cement be inserted, it is possible to cause the same to exude or appear between the lower end of the neck N² and the upper or turned-over portion of the lead soil-pipe P, which is soldered to the metal ring R, as described.

In Fig. 3 I have illustrated my improvement as applicable to an iron soil-pipe P, the metal floor flange or ring F in this instance having a downwardly-extending neck R', screw-threaded interiorly and adapted to receive the upper end of the soil-pipe P. With this form of the improvement the floor-flange is securely screwed to the soil-pipe P, so as to make an absolutely gas and water tight joint between said parts, after which the closet is seated in position and the parts secured together by the bolts $b\,b$ and nuts $n\,n$, the cement being allowed to harden and effectually seal the parts together.

I do not limit myself to any especial type of cement in connection with my novel improvement, as it is obvious that any cement when put in place in the metal ring R in plastic condition and which hardens afterward will answer the purpose. I have used in this connection putty in plastic state, litharge, and glycerin. Red lead with water or oil pitch may also be used. It will be apparent that by reason of the space between the vertically-extending flanges $f\,f$ in the floor-ring R the foot of the earthenware closet may be warped considerably and still admit of the parts being put together in such manner as to form a perfectly-sealed joint, a condition of affairs which is not possible with soil-pipe connections where an accurate joint is made to depend upon the direct union of the earthenware closet and the usual metallic-ring connection.

Having thus described my improvement, what I claim, and desire to secure by Letters Patent of the United States, is—

1. A soil-pipe connection consisting of a metal floor flange or ring provided with a space or chamber in its upper surface for receiving a pliable cement, in combination with an earthenware closet having a floor-flange provided with an enlarged groove in its under surface and means extending downwardly from the upper surface of said groove into the space or chamber in the floor flange or ring for causing the cement to be compressed and partially forced out of said space or chamber and into all of the spaces between the parts; together with bolts for firmly securing said parts to each other, substantially as described.

2. A soil-pipe connection consisting of a metal floor flange or ring provided with a downwardly-extending neck screw-threaded interiorly, and upwardly-extending concentric flanges constituting a space or chamber for receiving a pliable cement; in combination with an earthenware closet having a floor-flange provided with a groove in its under surface adapted to receive the upwardly-extending flanges of the first-named floor-flange and one or more downwardly-extending V-shaped rings adapted to be embedded in the cement, together with bolts for holding said parts securely to each other, the arrangement being such that when the parts are put together the cement is caused to thoroughly fill all of the interstices between them, substantially as described.

3. A soil-pipe connection consisting of a metal floor flange or ring secured to the upper end of the soil-pipe and having two upwardly-extending concentric flanges adapted to constitute a space or chamber for receiving a pliable cement; in combination with an earthenware closet provided with a floor-flange having a groove in its under surface adapted to receive the first-named floor-flange and provided with one or more downwardly-extending V-shaped rings, together with a cement and bolts for securing said parts together, said bolts being secured at their lower ends in screw-threaded holes in the first-named floor-flange and to the closet by nuts, the arrangement being such that when the parts are securely fastened together the cement is caused to fill all of the interstices between them, substantially as described.

4. A soil-pipe connection consisting of a metal floor flange or ring adapted to be secured to the soil-pipe, said flange being provided with upwardly-extending concentric flanges, in combination with a closet provided with a floor-flange having a groove adapted to receive the first-named floor-flange and having downwardly-extending concentric rings or flanges, together with bolts for securing said parts to each other and a cement adapted, when the parts are put together, to thoroughly fill all of the interstices, substantially as described.

5. A soil-pipe connection consisting of a metal floor flange or ring R having a downwardly-extending neck R' screw-threaded interiorly, and upwardly-extending concentric flanges $f f$ constituting a space or chamber for a pliable cement C; in combination with an earthenware closet provided with a floor-flange F having a groove in its under surface adapted to receive the upwardly-extending flanges $f f$, and downwardly-extending concentric V-shaped rings $v v$, together with bolts $b b$ secured by screw-threads to the first-named floor-flange and by nuts $n n$ to the closet, all of said parts being so arranged that when put together, the cement will be compressed and caused to thoroughly fill all of the interstices or spaces between them substantially as described.

In testimony whereof I have hereunto subscribed my name this 12th of April, 1899.

WINFIELD E. HINSDALE.

Witnesses:
   C. J. KINTNER,
   M. F. KEATING.